United States Patent Office 3,232,530
Patented Feb. 1, 1966

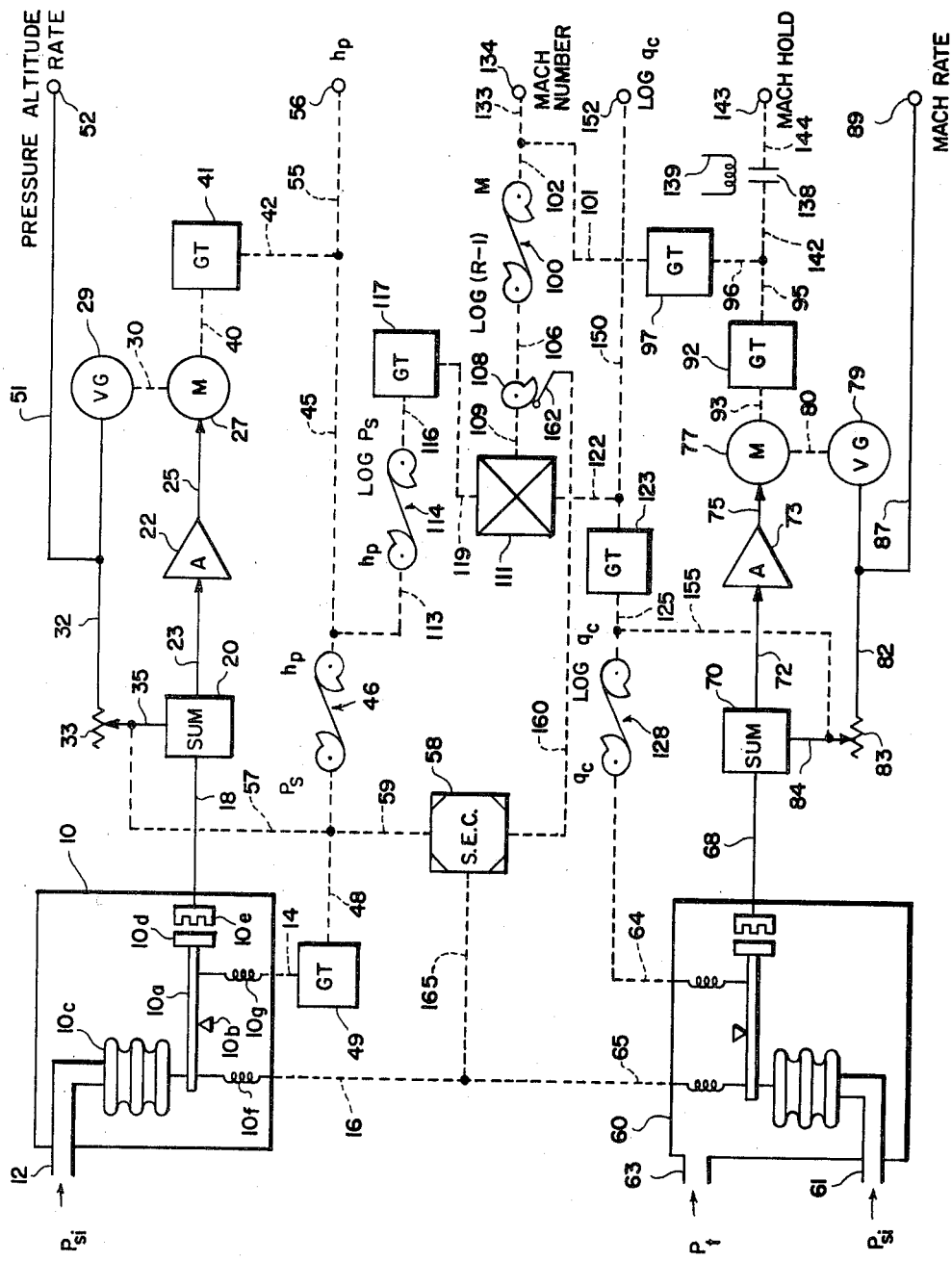

3,232,530
AIR DATA COMPUTER
Donald W. Ricke, Cedar, and Douglas C. Sanford, Princeton, Minn., assignors to Honeywell, Inc., a corporation of Delaware
Filed July 10, 1962, Ser. No. 208,868
8 Claims. (Cl. 235—61)

This invention relates to control apparatus and specifically to air data computer apparatus useful to provide a number of outputs indicative of various parameters needed by aircraft such as Mach number, altitude, air speed and the like which are utilized to control the aircraft or to provide indications for the pilot.

In the past, a wide variety of air data computers have been proposed which fall into three general categories; electrical, pneumatic, or mechanical. Electrical systems generally suffer from lack of high accuracy and frequent component failure. Pneumatic systems suffer from lack of response speed. Mechanical systems if properly manufactured overcome these disadvantages and provide long last accurate performance with rapid response rates. An example of a mechanical air data computer having these advantages may be found in the pending application of Robert W. Armstrong, Serial No. 153,436, filed November 20, 1961, now continued in application Serial No. 191,685, filed April 27, 1962, and assigned to the assignee of the present invention.

The present invention constitutes an improvement on the air data computer of the Armstrong application wherein further increased accuracy is obtainable for a number of outputs such as the rate of change of Mach number output and the Mach number hold signal output for use by an autopilot to maintain a preselected Mach number. Briefly, this is accomplished by novel circuitry which causes the motor responding to the difference between total pressure and static pressure to operate directly as a function of Mach number. By causing the motor to run directly as a function of Mach number a Mach number rate signal can be obtained with a simple velocity generator. In the prior art air data computers the Mach rate signal was derived through an electrical summing network in a more complicated and inaccurate manner. Likewise, the Mach number hold signal can be obtained through a simple gear train and clutch mechanism without having to utilize two sets of gear trains. In the prior art the Mach number hold signal was derived from a shaft which because of factors such as tape driven cams necessarily had to operate through a range of less than 360°. A first gear train was necessary to step the motor speed down so that this shaft did in fact rotate through less than 360° and then a second gear train was necessary to step the shaft rotation up to a point where an accurate Mach number hold signal could be obtained. Each of these gear trains introduced errors which were difficult to eliminate. The present invention requires only one gear train to produce a shaft rotating at the desired speed for accurate Mach number hold signal derivation. Another advantage of the present invention is realized because the motor which is operating as a function of Mach number drives the various Mach number outputs directly and not through a number of mechanical components such as differentials and cams. These and other advantages of the present invention will be more clearly understood upon examination of the following specification and claims when read in connection with the drawing showing a schematic representation of one embodiment of an air data computer employing the present invention.

The drawing shows a static or $P_s$ transducer 10 having a pneumatic input 12 connected to receive a signal indicative of indicated static pressure $P_{si}$ derived from a Pitot-static tube on the aircraft. The $P_s$ transducer may be of the form more completely described in the above mentioned Armstrong application but is shown here only schematically for simplicity. This $P_s$ tranducer has, in addition to the indicated static pressure input, a rebalance input shown by a dashed connection 14 and a static error correction signal $\Delta P$ input shown by dashed line 16. The transducer operates to produce an electrical signal on a conductor 18 whenever its elements are out of a balanced or null condition. Pressure transducer 10 is shown comprising a lever 10a pivoted about an axis 10b. The indicated static pressure $P_{si}$ is presented to a bellows 10c while the interior of the transducer 10 may be evacuated. If desired, the bellows 10c may be evacuated and the pressure $P_{si}$ applied to the interior of the transducer 10. Bellows 10c applies a force tending to rotate lever 10a about pivot 10b and thus moving a slug 10d with respect to an E transformer 10e to produce the output signal on conductor 18. The pressure correction signal is applied to lever 10a from the $\Delta P$ input 16 by means of a spring 10f. This force applied to the lever 10a modifies the force applied by bellows 10c to correct for the error which is inherent in the indicated static pressure. The rebalance force is applied to lever 10a from the rebalance input 14 by means of a spring 10g. Because of the static error correction $\Delta P$ input the output on conductor 18 varies with variations of true static pressure $P_s$. Conductor 18 presents the unbalance signal to an electrical summing network 20 where it is combined with a rate feedback signal, to be later described, and presented to an amplifier 22 by a conductor 23. Ground connections and power supply connections have been omitted from the drawing for simplicity. Amplifier 22 presents a signal by a conductor 25 to operate a motor 27. Motor 27 is connected to a velocity generator 29 by a mechanical connection shown as dash line 30. Velocity generator 29 produces a rate signal on a conductor 32 to a resistance winding 33 having a movable wiper 35. Movable wiper 35 is connected to the summing network 20 to provide the rate feedback signal. Motor 27 operates through a mechanical connection shown as dash line 40, gear train 41, a mechanical connection shown as dash line 42, a mechanical connection shown as dash line 45, a tape driven cam shown generally as 46, a mechanical connection shown as dash line 48 and a gear train 49 to present the rebalance signal to the $P_s$ transducer 10 at mechanical connection 14. Tape driven cam 46 is so characterized that it converts signals indicative of pressure altitude $hp$ into signals indicative of true static pressure $P_s$. Because of this, motor 27 operates as a function of pressure altitude $hp$. Likewise velocity generator 29 produces a voltage which is a function of pressure altitude rate and where desired for aircraft indication a signal therefrom may be obtained as on a conductor 51 connected to a terminal 52. The signal indicative of pressure altitude rate on terminal 52 may then be presented to the pilot or the autopilot for purposes of indicating this condition or controlling the aircraft in accordance therewith.

Likewise, if desired, the summing network 20, amplifier 22, motor 27, velocity generator 29, and rate feedback apparatus including conductor 32, resistor 33 and wiper 35 may be replaced by a rate actuated clutch motor combination more specifically described in the pending application of Robert W. Armstrong and Donald W. Ricke, Serial No. 167, 512, filed January 22, 1962. Use of the apparatus shown in the Armstrong and Ricke application would provide an improved followup system wherein the motor would be connected to the load shaft shown by dash line 40 after the servomotor had attained a predetermined operation rate so that the motor would start under a no load condition and a higher dynamic range of operation would be obtainable. This apparatus is not necessary for successful operation of the present invention and has thus not been shown in the drawing.

As previously stated motor 27 operates as a function of pressure altitude $hp$ and where a signal indicative of $hp$ is desired for indication or control purposes in the aircraft a shaft or mechanical connection shown as dash line 55 may be provided to produce the desired output on a terminal 56. Shaft 55 is shown connected to shaft 42 in the figure but it should be realized that it may be connected elsewhere, such as to shaft 40 and still obtain a signal indicative of pressure altitude.

Also as previously stated tape driven cam 46 operates to convert motion indicative of pressure altitude $hp$ to motion indicative of static pressure $P_s$. Therefore connection 48 and rebalance connection 14 operate as functions of true static pressure $P_s$. An output (not shown) may be connected to either connection 48 or connection 14 to provide a signal indicative of $P_s$ to the aircraft if desired.

To control the amount of rate feedback from velocity generator 29 to amplifier 22 in accordance with a function of true static pressure $P_s$ a mechanical connection shown as dash line 57 is provided which is connected between shaft 48 and wiper 35. Because of this connection various amounts of rate feedback are provided depending upon the value of true static pressure $P_s$. To obtain the exact function desired, resistance winding 33 may be characterized. This compensates for the change of mechanical gain with various static pressures which are inherent in the $P_s$ servo loop.

A static error corrector 58 is shown having an input mechanical connection shown as dash line 59 connected to shaft 48. Static error corrector 58 may be of the sort described in the above mentioned Armstrong application and mechanical connection 59 provides an input thereto indicative of true static pressure $P_s$ for purposes to be later described.

Also shown in the figure is a pressure differential or $qc$ transducer 60 having a first pneumatic input 61 connected to a source of indicated static pressure $P_{si}$ and a second pneumatic input 63 connected to a source of total pressure $P_T$ which may also be derived from the Pitot-static head on the aircraft. The $qc$ tranducer 60 may be similar to the $P_s$ transducer 10 which is like that referred to in the above mentioned Armstrong application. However, in the $qc$ transducer, the interior is not evacuated but rather has the total pressure $P_T$ applied thereto so that the force $P_T-P_{si}$ is applied to the movable lever. The $qc$ transducer 60 has a rebalance input shown as dashed connection 64 and a static error correction signal input $\Delta P$ shown as dash line 65. Whenever the mechanical apparatus in $qc$ transducer 60 is out of balance a signal is presented from the transducer on a conductor 68. This output signal varies with variations in true pressure differential because of the static error correction signal on connection 65 which operates within the transducer 60 to correct for the errors in the indicated static pressure $P_{si}$. The signal conductor 68 is fed to an electrical summing network 70 where it is combined with a rate feedback signal to be later described and presented by a conductor 72 to an amplifier 73. Amplifier 73 produces a signal on a conductor 75 to drive a motor 77 in accordance therewith. Motor 77 is connected to a velocity generator 79 by a mechanical connection shown as dash line 80. Velocity generator 79 produces a rate signal on a conductor 82 and a resistor 83 which has a movable wiper 84 operating thereon. Movable wiper 84 is connected to the summing network 70 to provide the rate feedback signal. As will be described, motor 77 operates in accordance with Mach number M and hence velocity generator 79 produces a rate signal which is indicative of the rate of change of Mach number. When it is desired to utilize this signal in an aircraft a conductor 87 is connected to the velocity generator 79 to present the Mach rate signal to a terminal 89 for use by the aircraft.

Motor 77 is shown connected to a gear train 92 by means of a mechanical connection 93 and from gear train 92 by mechanical connections 95 and 96 to a gear train 97. Gear train 97 is connected to a tape driven cam 100 by means of mechanical connections shown as dash lines 101 and 102. Tape driven cam 100 is characterized so as to convert signals indicative of Mach number into signals indicative of log $(R-1)$ where R is defined as the ratio $P_T/P_s$. Tape driven cam 100 is connected by mechanical connection shown as dash line 106 to a cam 108 and from thereby a mechanical connection shown as dash line 109 to a mechanical differential 111. Differential 111 is connected to shaft 45 in the $P_s$ servo loop by means of a mechanical connection shown as dash line 113, a tape driven cam shown generally as 114, a mechanical connection shown as dash line 116, a gear train 117, and a mechanical connection shown as dash line 119. Tape driven cam 114 is so characterized as to convert signals indicative of pressure altitude $hp$ into signals indicative of the logarithm of static pressure log $P_s$. As previously stated shaft 45 moves as a function of pressure altitude so that shafts 116 and 119 are caused to move as functions of log $P_s$ by virtue of the characterization of tape driven cam 114. Of course, by characterizing cam 114 differently, log $P_s$ could be derived from $P_s$ in which case cam 114 would be connected to shaft 48 or to shaft 14 rather than to shaft 45. Differential 111 also is connected by a shaft shown as dash line 122 to a gear train 123 and thence by a mechanical connection shown as dash line 125 to a tape driven cam shown generally as 128. Tape driven cam 128 is so characterized as to convert signals indicative of the logarithm of pressure differential, log $qc$, into signals indicative of pressure differential $qc$ and is connected to the rebalance input of the $qc$ transducer 60 by the mechanical connection 64.

From the apparatus thus far described it is seen that a signal from the $qc$ transducer 60 operates through conductor 68, summing network 70, conductor 72, amplifier 73 and conductor 75 to drive motor 77. Motor 77 operating through connection 93, gear train 92, connections 95 and 96, gear train 97, connections 101 and 102, tape driven cam 100, connection 106, cam 108, connection 109, differential 111, connections 122, gear train 123, connection 125, tape cam 128 and connection 64 to rebalance the $qc$ transducer 60. In order to rebalance the $qc$ transducer 60 the signal on connection 64 must be indicative of the difference between $P_T$ and $P_{si}$ as modified by $\Delta P$ or, in other words, the signal must be indicative of the true pressure differential $qc$. Because of the characterization of cam 128 the signal on connections 125 and 122 must therefore be indicative of log $qc$. Differential 111 operates to subtract the signals on connections 122 and 119 and since the signal on connection 119 is indicative of log $P_s$ the signal on connection 109 must be indicative of log $qc-$ log $P_s$. but $$\log qc - \log P_s = \log\left(\frac{qc}{P_s}\right) = \log\left(\frac{P_T-P_s}{P_s}\right) = \log\left(\frac{P_T}{P_s}-1\right)$$

Since R has been defined as $P_T/P_s$ it is apparent that the signal on shafts 109 and 106 must be indicative of log $(R-1)$ for the $qc$ transducer 60 to be properly balanced. Likewise, because of the characterization of tape cam 100, the signal on connections 102, 101, 96, 95 and 93 must be indicative of Mach number M. It is therefore seen that motor 77 in rebalancing the $qc$ transducer 60 must turn as a function of Mach number M. By the novel rebalance servo loop described above, motor 77 is caused to turn as a function of Mach number, as desired, and may thus operate directly to produce outputs which are functions of Mach number without having to go through the differential 111 and tape driven cam 100 first.

When it is desired, for example, to have an output indicative of Mach number M, a mechanical connection shown as dash line 133 connected to a terminal 134 may be provided. Mechanical connection 133 is shown connected to shaft 102 although it could be easily applied to shafts 96, 95 or 93 depending upon the desired speed of rotation of the output signal. Likewise where it is desired to hold a predetermined Mach number, a clutch 138 which is energizable by a coil 139 may be provided which is shown connected to shaft 96 by a mechanical connection shown as dash line 142 and which is connected to a terminal 143 by a mechanical connection shown as dash line 144. When it is desired to hold a predetermined Mach number, coil 139 is energized by the pilot or by other means (not shown) to engage clutch 138. Since shaft 96 is rotating as a function of Mach number, shaft 144 will rotate as a function of Mach number from the time clutch 138 is actuated. The signal on terminal 143 may then be presented to the autopilot to provide the Mach hold function desired. When coil 139 is deenergized clutch 138 will be returned to a neutral position by spring means (not shown). In order to get increased accuracy in the Mach hold function it is desirable to have the shaft 142 connected to a shaft which is rotating at an optimum rate. If shaft 96 were rotating throughout a range of less than 360°, as in the prior art, there would necessarily be a step-up gear train between shaft 96 and clutch 138. This would introduce additional errors to be compensated. Because motor 77 is turning as a function of Mach number in the present invention, a simple gear train such as 92 is employed to provide rotation of shafts 95 and 96 in the correct amount for the Mach hold function. If motor 77 were turning at the proper rate itself, shaft 142 could be connected to shaft 93 but since this is not the general case gear train 92 has been shown to provide the step-down ratio. Gear train 97 operates to reduce the rotation of shaft 96 so that shafts 101 and 102 do turn throughout a range of less than 360°. This is necessary since tape cam 100 obviously cannot rotate more than 360°.

Gear trains 41, 49, 117 and 123 also are placed in the figure to provide correct ratios for the various shafts to which they are connected and it is clear that some of these gear trains may be eliminated under certain conditions or other gear trains added where desired.

If an output indicative of indicated air speed is required, a mechanical connection shown as dash line 150 may be provided connected to a terminal 152. Mechanical connection 150 is connected to the mechanical connection 122 which is turning as a function of log $qc$. Indicated air speed is known to be a function of log $qc$ and hence the signal on terminal 152 is a function of indicated air speed which may be utilized by the aircraft.

As with the $P_s$ servo loop, the $qc$ servo loop changes gain as a function of $qc$. To vary the amount of rate feedback, wiper 84 is shown connected to shaft 125 by a mechanical connection shown as dash line 155. To obtain the exact function for the desired feedback the resistance winding 83 may be characterized. If it were more convenient, shaft 155 could be connected to shaft 64 so that wiper 84 moved as a function of $qc$ rather than as a function of log $qc$. In this case the characterization of resistance winding 83 might need to be slightly different than where shaft 155 is connected to shaft 125, but it is clear that the exact point of connection of this shaft is not of particular consequence.

As explained more fully in the above referenced Armstrong application static error corrector 58 produces an output indicative of static pressure error $\Delta P$. Static error corrector 58 operates to multiply two quantities $\Delta P/P_s$ and $P_s$ to obtain this $\Delta P$ output. The $P_s$ input for the static error corrector 58 is obtained on the mechanical connection 59 as previously explained. The $\Delta P/P_s$ input for the static error corrector is derived on a mechanical connection shown as dash line 160 which is connected to a follower arm 162 associated with the cam 108. The ratio $\Delta P/P_s$ is a known function of Mach number and a known function of log $(R-1)$ for a particular aircraft so that cam 108 which rotates as a function of log $(R-1)$ is cut in such a manner that movement of the follower 162 is in accordance with $\Delta P/P_s$. By cutting cam 108 differently, shaft 102 could be utilized to drive cam 108 as could shafts 101, 96, 95 or 93. The choice is usually a matter of convenience.

The output indicative of the static pressure error $\Delta P$ from static error corrector 58 is presented on a mechanical connection shown as dash line 165 which is in turn connected to the static error correction inputs 16 and 65 for the $P_s$ transducer 10 and the $qc$ transducer 60 respectively.

It is thus seen that air data computing apparatus has been provided wherein outputs which are functions of Mach number are obtainable directly from a motor which is caused to turn as a function of Mach number. Although not shown in the drawing, a number of other outputs may be provided such as pressure altitude hold, $P_s$, $qc$, and other functions of these quantities. Likewise it is obvious to one skilled in the art that many modifications can be made to the apparatus disclosed in connection with the preferred embodiment. We therefore do not intend to be restricted by the specific elements above described but intend only to be limited by the following claims.

We claim:
1. An air data computer comprising, in combination:
   a static pressure transducer having a first input connected to a source of indicated static pressure $P_{si}$, having a second input connected to a source of static error correction signal $\Delta P$, having a movable member normally in a null position, having means for applying forces to the movable member in accordance with $P_{si}$ and $\Delta P$ so that the movable member tends to move from the null position in accordance with true static pressure $P_s$, providing an output signal whenever the member moves from the null position, and having a rebalance input for applying a force to return the member to the null position;
   first motor means connected to said static pressure transducer and operable in accordance with the output signal therefrom;
   first cam means having a first portion and a second portion, said first cam means being so characterized that when the first portion moves in accordance with pressure altitude $hp$, the second portion moves in accordance with $P_s$;
   means connecting the first portion of said first cam means to said first motor means;
   means connecting the second portion of said first cam means to the rebalance input of said static pressure sensor, said first motor means operating upon movement of the movable member of said static pressure sensor from the null position to drive the first portion of said first cam means causing movement of the second portion of said first cam means to reposition the movable member of said static pressure transducer in the null position, the position of said first motor means and the first portion of said first cam means then being indicative of $hp$ and the position of the second portion of said first cam means being indicative of $P_s$;
   second cam means having a first portion connected to one of the portions of said first cam means, having a second portion and being operable to convert motion of the first portion into motion of the second portion indicative of log $P_s$;
   a pressure differential transducer having a first input connected to a source of indicated static pressure $P_{si}$, having a second input connected to a source of total pressure $P_T$, having a third input connected to a source of static error correction signal $\Delta P$, having a movable member normally in a null position, having means for applying forces to the movable member in accordance with $P_{si}$, $P_T$ and $\Delta P$ so that the movable member tends to move from the null position in accordance with true pressure differential $qc$, providing an output signal whenever the member moves from the null position, and having a rebalance input for applying a force to return the member to the null position;

second motor means connected to said pressure differential transducer and operable in accordance with the output signal therefrom;

third cam means having a first portion and a second portion, said third cam means being so characterized that when the first portion moves in accordance with Mach number M, the second portion moves in accordance with the log $qc$ minus log $P_s$;

means connecting the first portion of said third cam means to said second motor means;

a mechanical differential having first, second and third shafts, said differential being so arranged that motion of the second shaft is indicative of the difference between motion of the first shaft and motion of the third shaft;

fourth cam means having a first portion and a second portion, said fourth cam means being so characterized that when the first portion moves in accordance with log $qc$, the second portion moves in accordance with $qc$;

means connecting the first shaft of said differential to the second portion of said second cam means so that first shaft of said differential moves as a function of log $P_s$;

means connecting the second shaft of said differential to the second portion of said third cam means;

means connecting the third shaft of said differential to the first portion of said fourth cam means;

and means connecting the second portion of said fourth cam means to the rebalance input of said pressure differential transducer, said second motor means operating upon movement of the movable member of said pressure differential transducer from the null position to drive the first portion of said third cam means causing movement of the second portion of said third cam means to drive the second shaft of said differential, the third shaft of said differential thereby operating to move the first portion of said fourth cam means causing movement of the second portion of said fourth cam means to reposition the movable member of said pressure differential transducer in the null position, thereby causing the position of the second portion of said fourth cam means to be indicative of $qc$, the position of the first portion of said fourth cam means and the third shaft of said differential to be indicative of log $qc$, the position of the second shaft of said differential and the second portion of said third cam means to be indicative of log $qc$ minus log $P_s$, and the position of the first portion of said third cam means and said second motor means to be indicative of M.

2. Air data computing apparatus for use with a source of indicated static pressure $P_{si}$, a source of total pressure $P_T$ and a source of static pressure error $\Delta P$ comprising, in combination:

static pressure transducing means having an input connected to the source of $P_{si}$, having an input connected to the source of $\Delta P$ and having an output shaft the position of which varies with the logarithm of true static pressure log $P_s$;

differential pressure transducing means having an input connected to the source of $P_{si}$, having an input connected to the source of $P_T$, having an input connected to the source of $\Delta P$, having a movable member normally in a null position, having means applying forces to the movable member in accordance with $P_{si}$, $P_T$ and $\Delta P$ such that the movable member moves from the null position whenever true pressure differential $qc$ changes, having a rebalance input shaft, having means applying a rebalance force to the member in accordance with the position of the rebalance input shaft to return the member to the null position so that when the member is in the null position the position of the rebalance shaft is indicative of $qc$, and providing an output signal whenever the member moves from the null position;

motor means connected to said differential pressure transducing means to receive the output signal therefrom and operate in accordance therewith;

first cam means having a first portion connected to said motor means and having a second portion, said first cam means being so characterized that rotation of the first portion in accordance with Mach number M is accompanied by rotation of the second portion in accordance with the logarithm of $qc$ minus the logarithm of $P_s$;

second cam means having a first portion connected to the rebalance input shaft of said differential pressure transducing means and having a second portion, said second cam means being so characterized that rotation of the second portion in accordance with log $qc$ is accompanied by rotation of the first portion in accordance with $qc$;

mechanical differential means having first, second and third shafts so arranged that rotation of the second shaft is indicative of the rotation of the third shaft minus rotation of the first shaft;

means connecting the first shaft of said mechanical differential means to the output shaft of said static pressure transducing means;

means connecting the second shaft of said mechanical differential means to the second portion of said first cam means;

and means connecting the third shaft of said mechanical differential means to the second portion of said second cam means, the position of said motor means being indicative of M when the movable member of said differential pressure transducing means is in null position.

3. Air data computer apparatus comprising, in combination:

static pressure sensing means for producing an output shaft rotation indicative of the logarithm of true static pressure;

differential pressure sensing means having a member movable from a null position in accordance with variations in the difference between true static pressure and total pressure, having a rebalance input operable upon movement of the member to return the member to the null position and having an output shaft which rotates;

differential means having a first shaft connected to said static pressure sensing means to receive the shaft rotation indicative of the logarithm of true static pressure, having a second shaft and having a third shaft;

first characterized means having first and second portions and operable to convert first portion rotations indicative of Mach number to second portion rotations indicative of the difference between the logarithm of true static pressure and the logarithm of the difference between true static pressure and total pressure;

means connecting the first portion of said first characterized means to said differential pressure sensing means to receive the output shaft rotation therefrom;

means connecting the second portion of said first characterized means to the second shaft of said differential means;

second characterized means having first and second portions and operable to convert first portion rotations indicative of the logarithm of the difference between true static pressure and total pressure to second portion rotations indicative of the difference between true static pressure and total pressure;

means connecting the third shaft of said differential means to the first portion of said second characterized means;

and means connecting the second portion of said second characterized means to the rebalance input of said differential pressure sensing means.

4. Air data computing apparatus comprising, in combination:

pressure transducing means having a member movable from a null position upon variations of pressure differential between total pressure and static pressure, supplying an output signal whenever the member moves from the null position and having a rebalance connection operable to provide a signal to reposition the member to the null position, the signal provided by the rebalance connection then being indicative of pressure differential between total pressure and static pressure;

motor means connected to said pressure transducing means and operable in accordance with the output signal therefrom;

first characterized means connected to said motor means, said first characterized means being so characterized as to derive a signal indicative of the difference between the logarithm of static pressure and the logarithm of pressure differential from a signal indicative of Mach number;

a source of signal indicative of the logarithm of static pressure;

differential means connected to said first characterized means and to said source of signal and operable to derive a signal indicative of the logarithm of pressure differential from signals indicative of the logarithm of static pressure and of the difference between the logarithm of static pressure and the logarithm of pressure differential;

second characterized means connected to said differential means, said second characterized means being so characterized as to derive a signal indicative of pressure differential from a signal indicative of the logarithm of pressure differential;

and means connecting said second characterized means to the rebalance connection of said pressure transducing means to provide the signal to reposition the member thus requiring said motor means to operate in accordance with Mach number.

5. Apparatus of the class described comprising, in combination:

a differential pressure transducer having a member movable from a null position with variations in differential pressure, supplying an output signal which varies whenever the member moves from the null position and having a rebalance input to return the member to the null position, the signal on the rebalance input being indicative of the differential pressure;

difference means, including first, second and third connections, for producing a signal on the second connection indicative of the difference between any signals on the first and third connections;

means supplying a signal to the first connection of said difference means indicative of a first condition;

first characterized means connected between the rebalance input of said differential pressure transducer and the third connection of said difference means, said first characterized means operable for converting the signal on the rebalance input of said differential pressure transducer to a signal indicative of a second condition, the signal on the second connection of said difference means thereby being indicative of the difference between the first and second conditions;

second characterized means connected to the second connection of said difference means and connected to said differential pressure transducer to receive the output signal therefrom, said second characterized means operable for converting a signal indicative of the difference between the first and second conditions to a signal indicative of a third condition, the output signal from said differential pressure transducer thereby being indicative of the third condition.

6. Apparatus of the class described comprising, in combination:

a signal source having an output motion which is indicative of a predetermined function of a first condition;

balanceable means having a first input which varies with a second condition and having a second input which is variable in magnitude and which opposes the first input, said balanceable means being balanced when the second input is equal to the first input and being unbalanced upon change of the first input to produce an output signal;

rebalance means operable in accordance with the output signal from said balanceable means to vary the magnitude of the second input of said balanceable means to maintain said balanceable means in a balanced condition so that the magnitude of the second input of said balanceable means is normally indicative of the second condition, said rebalance means comprising, motor means connected to said balanceable means and operable in accordance with the output signal therefrom, first cam means having a first portion connected to said balanceable means and movable in accordance with the second input thereto, having a second portion and being so characterized that motion of the first portion indicative of the second condition is accompanied by motion of the second portion indicative of a predetermined function of the second condition, second cam means having a first portion connected to said motor means, having a second portion and being so characterized that motion of the first portion indicative of a third condition is accompanied by motion of the second portion indicative of a fourth condition, computer means having first, second and third connections and operable to produce motion on the second connection indicative of the difference between motion on the first connection and motion on the third connection, means connecting the first connection of the computer means to said signal source to receive the motion indicative of the predetermined function of the first condition, means connecting the third connection of said computer means to the second portion of the first cam means to receive the motion indicative of the predetermined function of the second condition, and means connecting the second connection of the computer means to the second portion of the second cam means, the fourth condition being indicative of the difference between the predetermined function of the first condition and the predetermined function of the second condition and the motor means of said rebalance means thereby moving in accordance with the third condition.

7. Apparatus of the class described comprising, in combination:

first characterized means having first and second portions, said first characterized means being so characterized that movement of the first portion in accordance with a first condition is accompanied by movement of the second portion in accordance with a second condition wherein the second condition is indicative of a third condition minus a fourth condition;

second characterized means having first and second portions, said second characterized means being so characterized that movement of the first portion in accordance with the third condition is accompanied by movement of the second portion in accordance with a fifth condition;

means for supplying a signal in accordance with the fourth condition;

balanceable means having an input movement which varies with the fifth condition, being unbalanced by variation in the fifth condition to provide an output movement which changes when said balanceable means is unbalanced, and having a balance input for supplying movement equal and opposite to the input movement to balance said balanceable means;

means connecting the second portion of said second characterized means to the balance input of said balanceable means to provide the movement to balance said balanceable means;

difference means having first, second and third movable members, movement of the second member being indicative of movement of the third member minus movement of the first member;

means connecting the first member of said difference means to said means supplying a signal so that the first member of said difference means moves in accordance with the fourth condition;

means connecting the third member of said difference means to the first portion of said second characterized means;

means connecting the second member of said difference means to the second portion of said first characterized means;

and means connecting the first portion of said first characterized means to said balanceable means so that the movable output therefrom moves the first portion of said first characterized means, the movable output of said balanceable means operating through said first characterized means, said difference means and said second characterized means to balance said balanceable means, the output movement of said balanceable means then being indicative of the first condition.

8. Apparatus of the class described comprising, in combination:

difference means for combining a signal indicative of a first variable and a signal indicative of a second variable to produce a signal indicative of the difference between the first variable and the second variable;

means presenting a signal indicative of the first variable to said different means;

first characterized means for converting a signal indicative of a third variable to a signal indicative of the difference between the first variable and the second variable;

means connecting said first characterized means to said difference means to convey a signal therebetween;

second characterized means for converting a signal indicative of the second variable to a signal indicative of a fourth variable;

means connecting said second characterized means to said difference means to convey a signal therebetween;

balanceable means for producing an output signal and balanceable means being balanced by a signal indicative of the fourth variable;

means connecting said balanceable means to said second characterized means so that a signal from said second characterized means operates to balance said balanceable means;

and means connecting said balanceable means to said first characterized means to present the output signal from said balanceable means to said first characterized means, the balance of said balanceable means by said second characterized means requiring that the signal from said second characterized means be indicative of the fourth variable, thus causing the signal between said second characterized means and said difference means to be indicative of the second variable, thus causing the signal between said difference means and said first characterized means to be indicative of the difference between the first variable and the second variable and thus causing the output signal from said balanceable means to be indicative of the third variable.

References Cited by the Examiner

UNITED STATES PATENTS

| | | | |
|---|---|---|---|
| 2,714,309 | 8/1955 | Redemske | 73—178 |
| 2,969,910 | 1/1961 | Reuter | 235—61 |

LEO SMILOW, *Primary Examiner.*

JOSEPH P. STRIZAK, *Examiner.*